United States Patent [19]
Matsukawa et al.

[11] Patent Number: 5,905,553
[45] Date of Patent: May 18, 1999

[54] LIQUID CRYSTAL DISPLAY

[75] Inventors: Fumio Matsukawa; Akira Tsumura; Shin Tahata; Masaya Mizunuma; Akira Tamatani; Yasuhiro Morii; Masayuki Fujii, all of Tokyo; Yasuo Fujita, Kumamoto, all of Japan

[73] Assignees: Mitsubishi Denki Kabushiki Kaisha, Tokyo; Advanced Display Inc., Kumamoto, both of Japan

[21] Appl. No.: 09/017,236

[22] Filed: Feb. 2, 1998

[30] Foreign Application Priority Data

Jul. 17, 1997 [JP] Japan ............................ 9-192535

[51] Int. Cl.⁶ .................................................. U02F 1/1335
[52] U.S. Cl. .................................................. 349/110
[58] Field of Search ................................................ 349/110

[56] References Cited

FOREIGN PATENT DOCUMENTS

| 4-20931 | 1/1992 | Japan . |
| 405313186 | 11/1993 | Japan . |
| 407077686 | 3/1995 | Japan . |
| 8-50203 | 2/1996 | Japan . |
| 8-110517 | 4/1996 | Japan . |

*Primary Examiner*—William L. Sikes
*Assistant Examiner*—James Dudek
*Attorney, Agent, or Firm*—Oblon, Spivak, McClelland, Maier & Neustadt, P.C.

[57] ABSTRACT

A liquid crystal display composed of an array substrate; a color filter substrate; a liquid crystal material interposed therebetween; a plurality of parallely spaced gate bus lines; a plurality of parallely spaced source bus lines; a plurality of pixel electrodes; a plurality of colored layers; and a light shield portion; wherein at a central portion of the first pixel pattern, gravity center of first pixel portion provided at the central portion of the first pixel pattern corresponds to gravity center of second pixel portion provided at a central portion of the second pixel pattern; and wherein at an end portion of the first pixel pattern, with respect to each viewing angle to each pixel, each second distance between any two adjacent gravity centers of pixels provided in the second pixel pattern is reduced to be shorter by prescribed length than each corresponding first distance between any two adjacent gravity centers of pixels corresponding to gravity centers of pixels provided in the first pixel pattern, in whole display area, so that the light shield portion on the color filter substrate shields leakage of light from the array substrate.

4 Claims, 8 Drawing Sheets

LIQUID CRYSTAL DISPLAY

BACKGROUND OF THE INVENTION

The present invention relates to LCD (liquid crystal display) to be used as a displaying apparatus for images and textual information for OA (office automation) appliance and the like, and more particularly to a configuration of LCD of a high quality of active matrix system for constraining the (displaying quality) reduction caused due to leakage of light in the pixels of an array substrate and for increasing aperture ratio.

The displaying quality means uniformity of luminance distribution in display area. If amount of leakage of light varies sharply between two places in the display area, displaying quality is degraded. Usually, the display area is divided to form a plurality of sub areas.

Accordingly, if leakage of light varies in each sub area, luminance difference between the sub areas causes a visible line so that displaying quality degrades.

FIG. 8 is an observing view of LCD of the active matrix system when the conventional size of display area is small. FIG. 9 is a sectional view of the pixel portion.

In FIG. 8, reference numeral 100 is an LCD, reference numeral 101 is a view-point of observer, and reference numeral 102 is a viewing angle θ.

In FIG. 9, reference numeral 10 is a first glass substrate which is a base member for an array substrate, reference numeral 11 is a source bus line formed on the surface of first glass substrate 10, reference numeral 14 is a pixel electrode which is a transparent conductive film such as ITO (indium tin oxide) or the like formed on the surface of first glass substrate 10, and reference numeral 16 is a polyimide thin film serving as an alignment layer.

An array substrate 70 is composed of first glass substrate 10, source bus line 11, gate bus line 12 (not shown) and pixel electrode 14.

Reference numeral 20 is a second glass substrate serving as a base member of a color filter substrate arranged opposite to array substrate 70, reference numeral 21 is a black matrix which is a light shield portion formed by patterning, a metal film of Cr or the like on the surface of second glass substrate 20 in lattice shape using photo-lithography, reference numeral 22 is a common electrode, reference numeral 23 is a colored layer of red, blue or green formed on the surface of second glass substrate 20, reference numeral 24 is an alignment layer which is a polyimide thin film, reference numeral 30 is a liquid crystal layer, and reference numeral 25 is a liquid crystal molecule of liquid crystal layer 30.

A color filter substrate 80 is composed of second glass substrate 20, black matrix 21, and colored layer 23.

Reference numeral 90 is a polarizer arranged on the surface of each of array substrate 70 and color filter substrate 80.

Reference numeral 40 is a clearance between pixel electrode 14 and source bus line 11, reference numeral 60 is leakage of light, showing an area where the leakage of light of the illuminating light is recognized from clearance 40 in a viewing angle when observed from view-point 101.

Leakage of light 60 of illuminating light from clearance 41 between gate bus line 12 and pixel electrode 14 not shown exists.

As shown in FIG. 9, in LCD of this type of active matrix system, a liquid crystal layer 30 is interposed through alignment layers 16 and 24 between an array substrate 70 and a color filter substrate 80 positioned on the side of view-point 101 of an observer.

A plurality of parallely spaced source bus lines 11 and a plurality of parallely spaced gate bus lines (not shown) extending in the direction perpendicular to the direction of gate bus lines are provided in lattice shape on the array substrate 70. Each area partitioned by adjacent two source bus lines and adjacent two gate bus lines is pixel portion. One pixel electrode 14 and one switching element such as TFT (thin film transistor) are provided to each pixel portion. Colored layer 23 is provided on color filter substrate 80.

Colored layer 23 is partitioned by approximately the equal distance by black matrix (BM) 21 serving as light shield portion arranged in lattice shape, to become a pixel portion.

The illuminating light exists as a back light under the array substrate 70. BM 21 serving as a light shield portion of color filter substrate 80, when pixel of LCD 100 is seen from view-point 101 of observer, is required to prevent leakage of light 60 from the clearances 40 or 41 between source bus line 11 of array substrate 70 or gate bus line 12 and pixel electrode 14 in all of the pixels.

FIG. 10 is an observation view of LCD of active matrix system when a size of display area has become larger than that shown in FIG. 8 and FIG. 9. FIG. 11 is a sectional view of its pixel portion.

A viewing angle θ becomes larger, in the case of the observing the right and left ends or the upper and lower ends of the display area of LCD 100, as size of the display area is enlarged (see FIG. 10 and FIG. 11).

As shown in the sectional view of a pixel portion of FIG. 11, in each area of the right and left end portions (or upper and lower end portions) of the display area where viewing angle θ becomes larger, the width of BM 21 serving as a light shield portion of color filter substrate 80 has to be increased to shield leakage of light 60, thereby lowering aperture ratio of the pixel portion due to increase in width of BM 21.

In addition, leakage of light is caused by positional displacement in the formation of the pixel pattern of array substrate 70. The displacement is caused by mismatching the position of source bus lines and gate bus lines with respect to the standard position determined by a mark for aligning (alignment mark) which is used at the time when array substrate is exposed.

The pixel pattern (first pixel pattern) formed on array substrate 70 is conducted in a patterning step by a lens projection system. This is a system in which a light exposure is conducted by using lens, exchanging a plurality of reticles (small-sized masks).

The light exposure is conducted for each step by moving a stage for fixing the substrate.

The method is effective for use where a light exposing operation is repeated with the use of reticle of the same design for one array substrate 70, because step by step light exposure can be performed.

However, when substrates are exposed by such stepper system in order to produce LCD having a large-sized display area, it is necessary to form a pixel pattern on array substrate 70 by dividing the large-sized display area into a plurality of exposure area and by exposing the plurality of areas. At this time, if the mask pattern is displaced from a prescribed position, the pixel pattern on the array substrate 70 is also displaced from a prescribed designed position. The displacement of the mask pattern is caused by warp of a large-sized glass substrate for array substrate or color filter substrate, or by misalignment of a mask with respect of the standard position, the mask being used when exposing.

On color filter substrate 80, BM 21 is formed by light exposure of one time for entire surface, namely, the pixel patterns (second pixel pattern) are formed at the same time, thereby making the interval of pixel portions constant in the entire area of the display area.

When array substrate 70 and color filter substrate 80 are superposed oppositely, the positional relation between the pixel of array substrate 70 and the pixel of color filter substrate 80 become different for each exposure area, thereby causing luminance difference for each exposure area.

The luminance difference is caused by displacement of pixel pattern when disposing. The displacement causes variations of aperture ratio in each exposure area. Accordingly, the variations of aperture ratio result in the luminance difference.

When LCD is observed obliquely for luminance difference, the difference is considerably observed.

FIG. 12 shows a sectional view of a pixel portion of exposure area formed as designed in the pixel pattern on the side of array substrate 70.

In this case, in observation from the oblique direction as shown, leakage of light 60 from clearance 40 between source bus line 11 on the side of array substrate 70, and pixel electrode 14 is shielded by BM 21 formed on the side of color filter substrate 80.

FIG. 13 is a sectional view of a pixel portion in exposure area formed due to displacement in the left direction of the pixel pattern on the side of array substrate 70.

In this case, in observation from the left oblique direction as shown, leakage of light 60 from clearance 40 between the source bus line 11 on the side of array substrate 70, and pixel electrode 14 can not be shielded by BM 21 on the side of color filter substrate 80. Thus, luminance difference is caused with respect to exposure area formed without displacement to the pixel pattern of color filter substrate 80.

Although adverse effects caused due to leakage of light 60 from clearance 40 between source bus line 11 and pixel electrode 14 are described, the similar problems are caused even from leakage of light 60 from clearance 41 (not shown) between gate bus line 12 (not shown) on the side of array substrate 70, and pixel electrode 14.

To prevent difference in the luminance caused due to displacement in positional relation between the pixel pattern of color filter substrate 80 for each exposure area caused in this manner and the pixel pattern of array substrate 70, the width of BM 21 to be formed on color filter substrate 80 is required to be sufficiently enlarged.

That is, in the left, right and upper, lower ends of the display area, viewing angle becomes largest.

Therefore, the width of BM 21 in the left, right and upper, lower ends of the display area is required to be largest. Conventionally, the required largest width of BM 21 is applied to all BMs in the display area.

As described above, in the conventional LCD, leakage of light from clearance between the source bus line of the array substrate or the gate bus line, and the pixel electrode, even when the central portion of the display area smaller in the viewing angle from the given view-point position (normally the central portion front face of the display area) and even when the right, left or the upper, lower end portions of the display area when the viewing angle becomes larger, is seen. To prevent the leakage of light and difference in the luminance for each exposure area from being caused, it is required to cover and hide with BM having width sufficiently large on the color filter substrate side.

Therefore, when the pixel of the color filter substrate in the entire area of the display area is formed repeatedly in the same pixel construction, the width of the BM serving as the light shield portion is necessary to be larger than the width necessary in the pixel of the exposure area of the display area central portion, thereby causing such a defect as to lower aperture ratio of the pixel.

Accordingly, an object of this invention is to solve the problems of the conventional LCD and to provide LCD which can obtain higher aperture ratio even in a large-sized LCD where the viewing angle becomes larger, and can obtain higher quality of displaying quality constrained in adverse effects caused through the leakage of light.

SUMMARY OF THE INVENTION

The liquid crystal display according to the present invention comprises: an array substrate; a color filter substrate opposite to the array substrate; a liquid crystal material interposed between the array substrate and the color filter substrate; a plurality of parallely spaced gate bus lines provided on the array substrate; a plurality of parallely spaced source bus lines extending in the direction perpendicular to the direction of the gate bus lines and intersecting the gate bus lines, the plurality of gate bus lines and the plurality of source bus lines being arranged in lattice shape as a first pixel pattern, an area surrounded by any two adjacent gate bus lines and any two adjacent source bus lines being a first pixel portion; a plurality of pixel electrodes each provided in the first pixel portion; a plurality of colored layers each provided on the color filter substrate; and a light shield portion arranged in lattice shape as a second pixel pattern, the lattice shape having blank areas spaced by approximately equal distances on the color filter substrate, each blank area partitioned by the light shield portion, the each blank area serving as a second pixel portion, each colored layer being provided in the second pixel portion so that the plurality of colored layers are partitioned by the light shield portion by approximately equal distance to form the second pixel portion, the second pixel portion corresponding to the first pixel portion; wherein at a central portion of the first pixel pattern, gravity center of first pixel portion provided at the central portion of the first pixel pattern corresponds to gravity center of second pixel portion provided at a central portion of the second pixel pattern; and wherein at an end portion of the first pixel pattern, with respect to each viewing angle to each pixel, each second distance between any two adjacent gravity centers of pixels provided in the second pixel pattern is reduced to be shorter by prescribed length than each corresponding first distance between any two adjacent gravity centers of pixels corresponding to gravity centers of pixels provided in the first pixel pattern, in whole display area, so that the light shield portion on the color filter substrate shields leakage of light from the array substrate.

In the liquid crystal display according to the present invention, wherein each second distance is reduced to be shorter than the each corresponding first distance in order to satisfy the following relationship $$Z \geq \sum_L T_L \times \tan\left[\sin^{-1}\left(\frac{n_A}{n_L}\sin\theta\right)\right]$$

wherein θ represents a viewing angle to any one of pixels in the second pixel pattern; $T_L$ represents each thickness of layers through which leakage of light transmits, the layers being located from an upper surface of a first glass substrate to a lower surface of a second glass substrate, the first glass substrate serving as a base member of the array substrate, the second glass substrate serving as a base member of the color filter substrate; $n_L$ represents each refractive indexes of the layers; $n_A$ represents a refractive index of air existing from the upper surface of the array substrate to view-point; and Z represents a displacement amount of a gravity center of the any one of pixel in the second pattern with respect to a gravity center of a corresponding pixel in the first pattern toward the central portion of the display area so that the each second distance is reduced to be shorter than the each corresponding first distance.

In the liquid crystal display according to the present invention, the second pixel pattern is divided to a plurality of areas and, with respect to each viewing angle to each divided area, the each second distance is reduced to be shorter than the each corresponding first distance per the each divided area so that the light shield portion shields the leakage of light.

In the liquid crystal display according to the present invention, wherein a gravity center of a mark for aligning provided for the sake of superposing the array substrate and the color filter substrate at predetermined position, the mark for aligning being provided at outside of a display area on the color filter substrate, corresponds to gravity center of mark for aligning provided on the array substrate.

DETAILED DESCRIPTION

Figure 1:
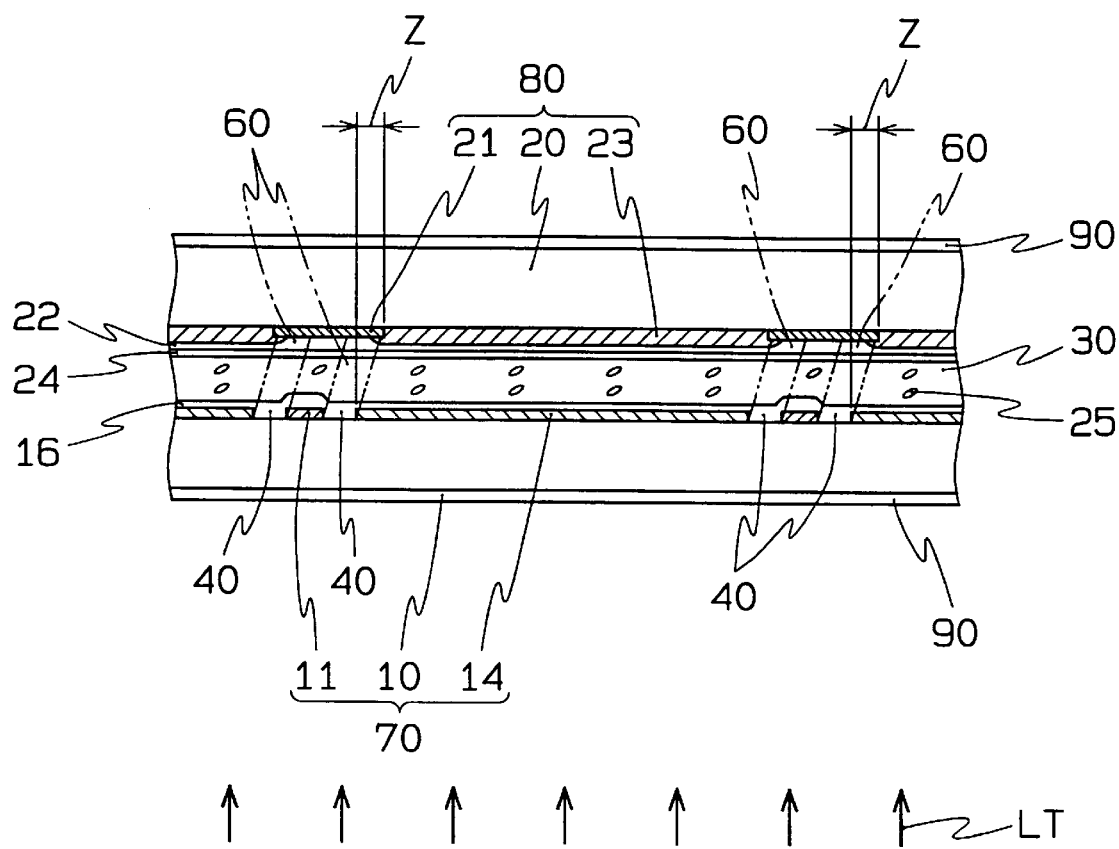
FIG. 1 is a cross-sectional view showing a pixel in the left end portion of LCD according to Embodiment 1 of the present invention.

One embodiment of the invention will be described hereinafter in accordance with drawings. Referring to the drawings, the same reference numerals as those of the conventional ones represent the same as or the corresponding to the conventional reference numerals.

Embodiment 1

Figure 2:
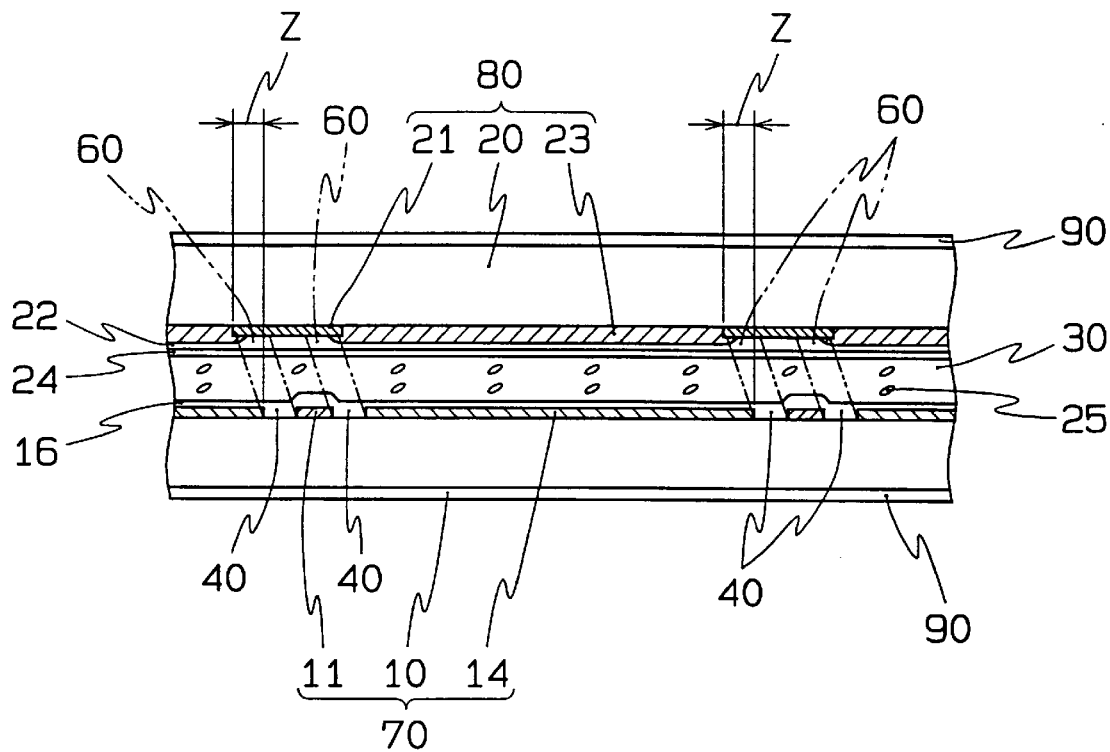
FIG. 2 is a cross-sectional view showing a pixel in the right end portion of LCD according to Embodiment 1 of the present invention.
Figure 3:
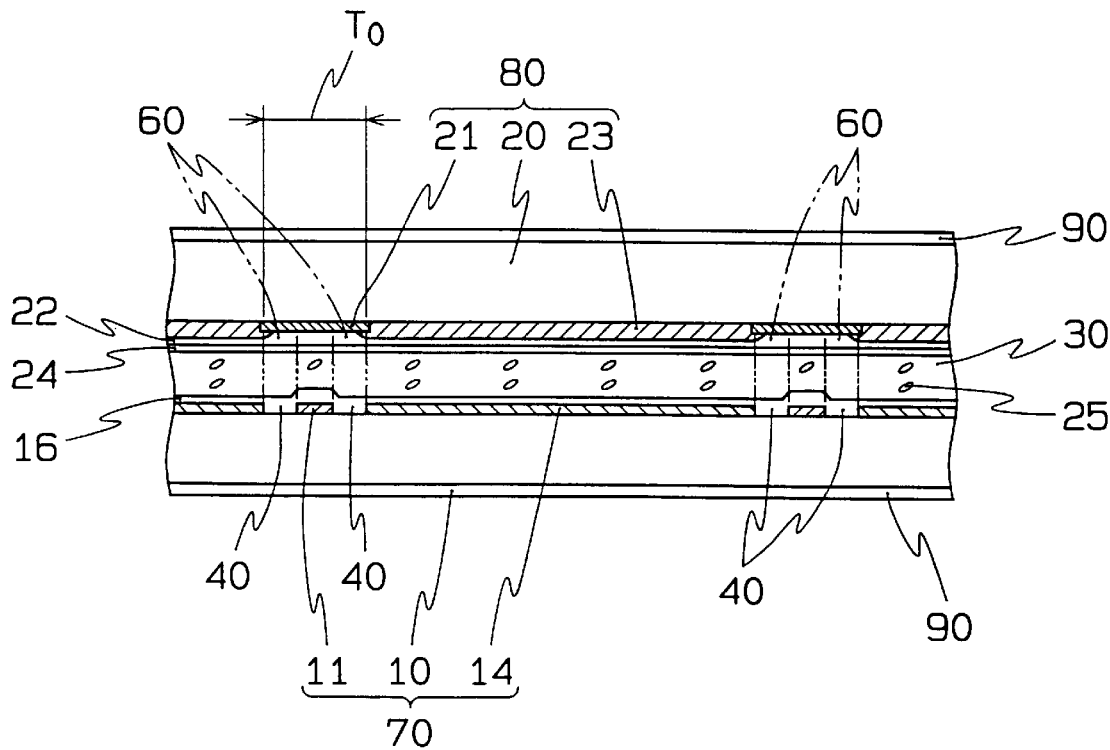
FIG. 3 is a cross-sectional view showing a pixel in the central portion of LCD according to Embodiment 1 of the present invention.

FIG. 1 shows a sectional face of the left end portion of the display area of LCD according to the embodiment 1. FIG. 2 is a sectional view of the right end portion of the display area. FIG. 3 is a sectional view of the central portion of the display area.

Referring to the drawings, reference numeral 10 is a first glass substrate which is a base member of an array substrate. Reference numeral 11 is a source bus line formed on the surface of first glass substrate 10. Reference numeral 14 is a pixel electrode which is a transparent conductive film such as ITO formed on the surface of first glass substrate 10. Reference numeral 16 is polyimide thin film serving as an alignment layer which is a polyimide thin film.

An array substrate 70 is composed of first glass substrate 10, source bus line 11, gate bus line 12 (not shown) and pixel electrode 14.

Reference numeral 20 is a second glass substrate serving as a base member of a color filter substrate arranged opposite to array substrate 70.

Reference numeral 21 is a black matrix which is a light shield portion formed by patterning metal film of Cr or the like on the surface of second glass substrate 20 in "lattice shape", using photo-lithography, reference numeral 22 is a common electrode, and reference numeral 23 is a colored layer of red, blue or green formed on the surface of second glass substrate 20. Reference numeral 24 is an alignment layer which is a polyimide thin film. Reference numeral 30 is a liquid crystal layer. Reference numeral 25 is a liquid crystal molecule of the liquid crystal layer 30.

A color filter substrate 80 is composed of second glass substrate 20, black matrix 21, and colored layer 23.

Reference numeral 90 is a polarizer arranged on the surface of each of array substrate 70 and color filter substrate 80. Reference LT is an illuminating light.

As in the above described conventional example, even in an active matrix system of LCD in the present embodiment, liquid crystal layer 30 is interposed through alignment layers 16 and 24 between an array substrate 70 and a color filter substrate 80 positioned on the side of view-point 101 of observer. A plurality of parallely spaced sourse bus lines 11 and a plurality of parallely spaced gate bus lines (not shown) extending in the direction perpendicular to the direction of the gate bus lines are provided in lattice shape on the array substrate 70.

Each area partitioned by adjacent any two source bus lines and adjacent any two gate bus lines is pixel portion. One pixel electrode 14 and one switching element such as TFT and so on are provided to each pixel portion. Colored layer 23 is provided on color filter substrate 80.

Colored layer 23 is partitioned by approximately the equal distance by black matrix (BM) 21 serving as light shield portion arranged in lattice shape. A first pixel pattern comprises a plurality of the pixel portions on the array substrate, and a second pixel pattern comprises a plurality of the pixel portions on the color filter substrate. Each pixel portion on the second pixel pattern corresponds to each pixel portion on the first pixel pattern. Further, a pixel composed of a plurality of pixels corresponding to each pixel portion of the array substrate 10 is formed.

An illuminating light exists as a back light under the array substrate 70. BM 21 which is a light shield portion formed on color filter substrate 80, in a viewing angle provided when the pixel in the entire areas of the display area of LCD 100 from the view-point 101 of observer, is formed to shield the leakage of light 60 from clearance between source bus line 11 of array substrate 70 or gate bus line 12 and pixel electrode 14 in all the pixels.

A given signal voltage fed by a source bus line 11 formed on array substrate 70 is controlled by gate bus line 12 not shown for each pixel, and is given to pixel electrode 14 which is a transparent conductive film such as ITO and so on. A predetermined signal voltage is applied even upon a common electrode 22 formed on the color filter substrate 80 to add an electrical field applied from outside on the side between array substrate 70 and color filter substrate 80 to drive liquid crystal molecule 25, so as to give a displaying contrast.

On the surface of second glass substrate 20 which is a base member of color filter substrate 80, there are formed BM 21 comprising a metal film of Cr or the like patterned in lattice shape by photo-lithography, and a colored layer 23 of red, blue or green. The alignment layer 24 of the polyimide thin film is formed on the BM 21 and colored layer.

Further, rubbing treatment is conducted to the surface of alignment layer 24 in order that liquid crystal is oriented.

The surface on the side of liquid crystal layer 30 of array substrate 70 is covered with a polyimide thin film to which rubbing treatment is conducted, i.e., an alignment layer 16, likewise.

In this embodiment, to shield leakage of light 60 from clearances 40 and 41 between pixel electrode 14 and source bus line 11 or gate bus line 12 in the viewing angle, in the pixel of the end portion of the display area where the viewing angle becomes larger, a position of BM 21 formed in color filter substrate 80 is displaced to constrain the increase of the width to minimum. (see FIG. 1, FIG. 2 and FIG. 3)

Namely, the view-point of observer is usually in the front face of approximate central portion. In this case, as the viewing angle with respect to the pixel of the central portion of the display area is almost zero.

The location of BM 21 is decided by corresponding the center of BM 21 to the center of source bus line 11 (or gate bus line 12), and width To of BM 21 is decided by adding the width of source bus line 11 (or gate bus line 12) and the width of clearance 40 between pixel electrodes 14 on both the sides, through agreement between a center thereof and a center of source bus line 11 (or gate bus line 12).

In a pixel of an area of an end portion of the display area where the viewing angle becomes larger, the central portion has to be properly displaced onto the central side of the display area with respect to the center of source bus line 11 (or gate bus line 12) in such a manner that the width of BM 21 formed on color filter substrate 80 is decided to be the same as that in the central portion, so as to shield while leakage of light from clearance 40 (or clearance 41) between a pixel electrode in the viewing angle and source bus line 11 (or a gate bus line 12). (See FIGS. 1 and 2)

Namely, the width of BM 21 is made the same in the entire area of the display area with a minimum necessary size for shielding leakage of light when the viewing angle is zero (normally, the central portion of the display area). The viewing angle of BM 21 is increased subsequently in positional displacement amount onto zero side as the viewing angle increases. Even in an area (namely, the end portion of the display area) where the viewing angle becomes largest, color filer substrate 80 has only to be designed so that leakage of light 60 can be shielded by BM 21.

A method for easily manufacturing such color filter substrate 80 will be described by one example.

A preliminary original pattern for forming BM 21 is made so that only a portion corresponding to the pixel electrode 14 of array substrate 70 may be an opening portion in the entire area of the display area.

Namely, the preliminary pattern is produced so that the preliminary pattern can cover and hide source bus line 11 of array substrate 70, gate bus line 12, and clearance 40 and 41 between each bus line and pixel electrode 14.

Then, a second pattern is prepared from the preliminary pattern with the use of photo-lithography or the like, by reducing in the whole preliminary pattern by a predetermined contraction rate.

When a color filter substrate 80 and an array substrate 70 where BM 21 is formed by use of a second pattern are arranged oppositely through a liquid crystal layer 30 in such a manner that the central pixel in display area of color filter substrate 80 corresponds to be central pixel in display area of the array substrate, the contraction ratio at this time has to be set so that BM 21 is arranged in a position where leakage of light 60 can be shielded from source bus line 11 or gate bus line 12 and clearances 40 and 41 between each bus line and pixel electrode 14 as to a viewing angle with respect to the pixel of the display area end portion.

A distance between the gravity centers of the pixel in a pixel pattern (second pixel pattern) on color filter substrate 80 manufactured in this manner is designed to be smaller with respect to the distance between the gravity centers in the pixel pattern (first pixel pattern) of the corresponding array substrate 70.

In other words, at the central portion of the first pixel pattern, gravity center of pixel provided at the central portion of the first pixel pattern corresponds to gravity center of pixel provided at the central portion of the second pixel pattern.

At the same time, at the end portion of the first pixel pattern each second distance between any two adjacent gravity centers of pixels provided in the second pixel pattern is reduced to be shorter by prescribed length than each corresponding first distance between any two adjacent corresponding gravity centers of pixels provided in the first pixel pattern, with respect to each viewing angle to each pixel in whole display area, so that the light shield portion on the color filter substrate shields leakage of light from the array substrate.

Therefore, in the center of the display area, as shown in FIG. 3, the center of BM 21 of color filter substrate 80 is displaced by necessary amount (namely, amount necessary enough to shield leakage of light 60 in the viewing angle with respect to the end portion) with respect to the center of source bus line 11 (or gate bus line 12) of array substrate 70, as shown in FIG. 1 or FIG. 2, in the end portion of the display area with agreement between the center of the source bus line 11 (or the gate bus line 12) of array substrate 70 and the center of BM 21 of color filter substrate 80.

Then, a concrete design example of such a color filter substrate 80 as above will be described.

In order to shield completely the leakage of light 60 from clearance 40 between source bus line 11 (or gate bus line 12) on array substrate 70 in the pixel portion, and the pixel electrode 14, an amount (namely, the displacement amount of BM 21) Z from an end of pixel electrode 14 to be extended to the inner side of the display area by BM 21 on color filter substrate 80 requires a value to satisfy the relationship of the next equation (1), with respect to each thickness $T_L$ of layers though which leakage of light transmits wherein the layers are located from upper surface of the first glass substrate to a lower surface of the second substrate and the first glass substrate is a member of the array substrate and the second glass substrate is a basic member of the color filter substrate.

$$Z \geq \sum_L T_L \times \tan[\sin^{-1}(nA/nL\sin\theta)] \qquad (1)$$

wherein

θ: a viewing angle with respect to any one of pixel of a pixel pattern (second pixel pattern) on color filter substrate 80, $T_1$: thickness of colored layer 23, $T_2$: thickness of common electrode (ITO electrode) 22, $T_3$: thickness of alignment layer 24 to be formed (coated, dried and baked) on the side of color filter substrate 80, $T_4$: thickness of liquid crystal layer 30, $T_5$: thickness of alignment layer 16 to be formed (coated, dried and baked) on the side of array substrate 70, $n_A$: a refractive index of air existing on the side of observer of color filter substrate 80, $n_1$: a refractive index of colored layer 23, $n_2$: a refractive index of common electrode (ITO electrode) 22, $n_3$: a refractive index of alignment layer 24 to be applied on the side of color filter substrate 80, $n_4$: an average refractive index of liquid crystal layer 30, and $n_5$: a refractive index of alignment layer 16 applied on the side of array substrate 70.

A displacement amount Z shown by this equation (1) is an amount where the gravity center of a pixel on array substrate 70 is displaced to the pixel gravity center on color filter substrate 80 in viewing angle θ.

In this embodiment, as a liquid crystal molecule of liquid crystal layer 30 is used S811 (made by Merck JAPAN) added by 0.1 wt % to ZLI - 1565 (made by Merck JAPAN).

In this embodiment, for example, thickness of each layer or film is as follows.

$T_1$=1.5 μm, $T_2$=0.2 μm, $T_3$=0.1 μM, $T_4$=5. 0 μm, $T_5$=0.1 μm

Also, a refractive index of each layer or film is as follows.

$n_A$=1.0, $n_1$=1.5, $n_2$=2.0, $n_3$=1.5, $n_4$=1.6, $n_5$=1.5

In this case, when a panel size is 30 cm, a viewing angle is 31° in the left, right end of a display area in observation from 25 cm right over of the display area center.

From the calculation results of the above-described equation (1), in the left and right ends of the display area of LCD in this embodiment, amount Z where BM 21 on color filter substrate 80 for shielding leakage of light 60 is displaced onto the inner side of the display area from the end of pixel electrode 14 requires 2.4 μm or more.

Accordingly, in this embodiment, the width of BM 21 of color filter substrate 80 equals to the distance between pixel electrodes 14 on array substrate 70 and the distance of the gravity centers between the left end pixel and the right end pixel of the color filter substrate is made in contraction by 4.8 μm with respect to the distance of the gravity center between the pixel of the left end of array substrate 70 and the pixel of the right end portion. Thus, color filter substrate 80 contracted in a pixel pattern has only to be used.

Color filter substrate 80 designed as described above is made as follows. A metal film (as thick as 300 nm) of Cr or the like is formed by sputtering on a second glass substrate serving as a base member of color filter substrate 80, and is patterned in lattice shape by photo-lithography.

Colored layer 23 of red, blue or green as thick as 1.5 μm is provided by using a pigment dispersion photoresist on the opening portion is provided. On it is formed a transparent conductive film as thick as 200 nm, by sputtering, as a common electrode 22.

Further, after alignment layer 23 which is a polyimide thin film is formed as thick as 100 nm is formed, alignment treatment is conducted by rubbing treatment to the surface of alignment layer 23.

According to this embodiment, when a display area is observed, from above, in the center of the area, even in the central portion of the display area and the left, right ends of the display area, leakage of light 60 from the clearance 40 (or clearance 41) between source bus line 11 (or gate bus line 12) on array substrate 70, and pixel electrode 14 can be largely shielded.

In LCD of a color filter substrate constructing the whole display area of the conventional example by repetition of the same pixel construction, BM 21 is required to be extended by 2.4 μm or more onto the side of the pixel electrode 14 on both the corresponding sides in the entire area of the display area. As compared with the conventional examples, BM width of 4.8 μm in the pixel of the display area central portion, of 2.4 μm in the display area end portions are reduced in the light shield portion, improving the aperture ratio considerably.

Although the above description is given about an example, when leakage of light 60 from clearance 40 of source bus line 11 on array substrate 70, and pixel electrode 14 is shielded, BM 21 of color filter substrate 80 with respect to gate bus line 12 (not shown) is designed in accordance with the above described (1) in an amount to be extended from the end of pixel electrode 14 into a pixel so that adverse effect of the leakage of light from clearance 40 (not shown) between gate bus line 12 and pixel electrode 14 can be prevented and aperture ratio can be significantly improved.

According to this embodiment, in the whole area of the display area, the width of BM 21 of color filter substrate 80 is made same as the least width necessary for the pixel of the smallest central portion of the viewing angle, and the central displacement amount of the center of BM 21 of color filter substrate 80 is designed in accordance with the above described equation (1) with respect to the center of the source bus line 11 of the array substrate 70 or the gate bus line 12. Even in the large-sized LCD where the viewing angle is large in the display area end portion, adverse effects for causing the leakage of light of array substrate 10 can be controlled and aperture ratio can be improved, thus realizing a large-sized LCD having the higher displaying quality.

Embodiment 2

Figure 4A:
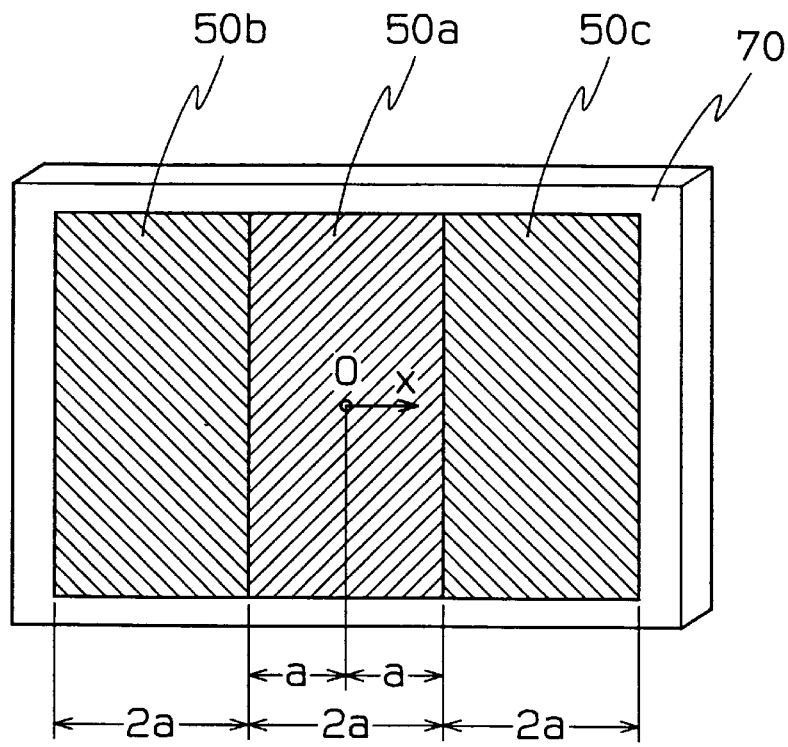
FIG. 4 is an explanatory view illustrating LCD according to Embodiment 2 of the present invention.
Figure 4:
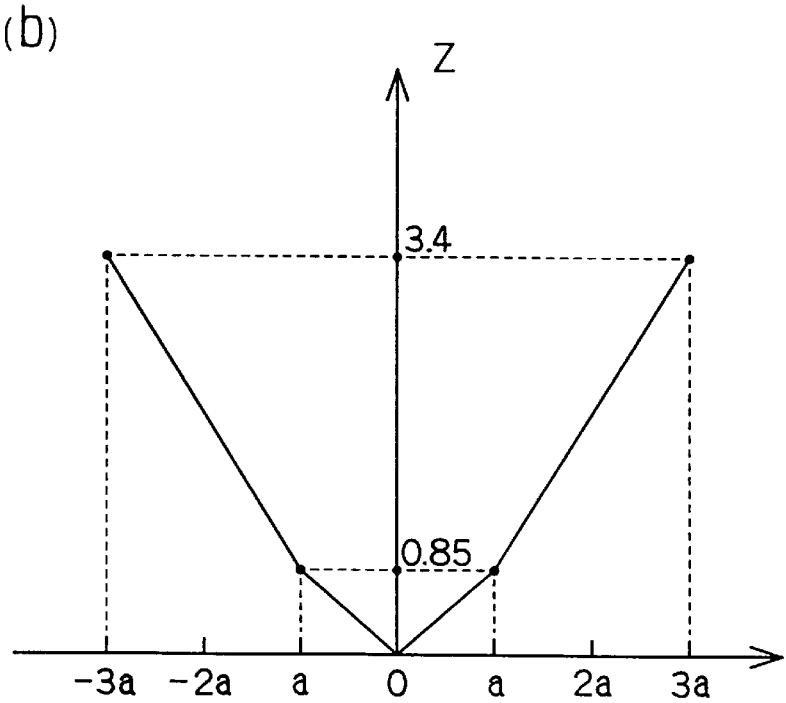

FIG. 4 is a view for illustrating LCD in an embodiment 2. FIG. 4 (*a*) is a divided exposure area of an array substrate in the embodiment 2. FIG. 4 (*b*) is a view showing the relationship between a distance x from the center of the display area of the object pixel and a necessary displacement amount Z of BM 21.

Figure 5:
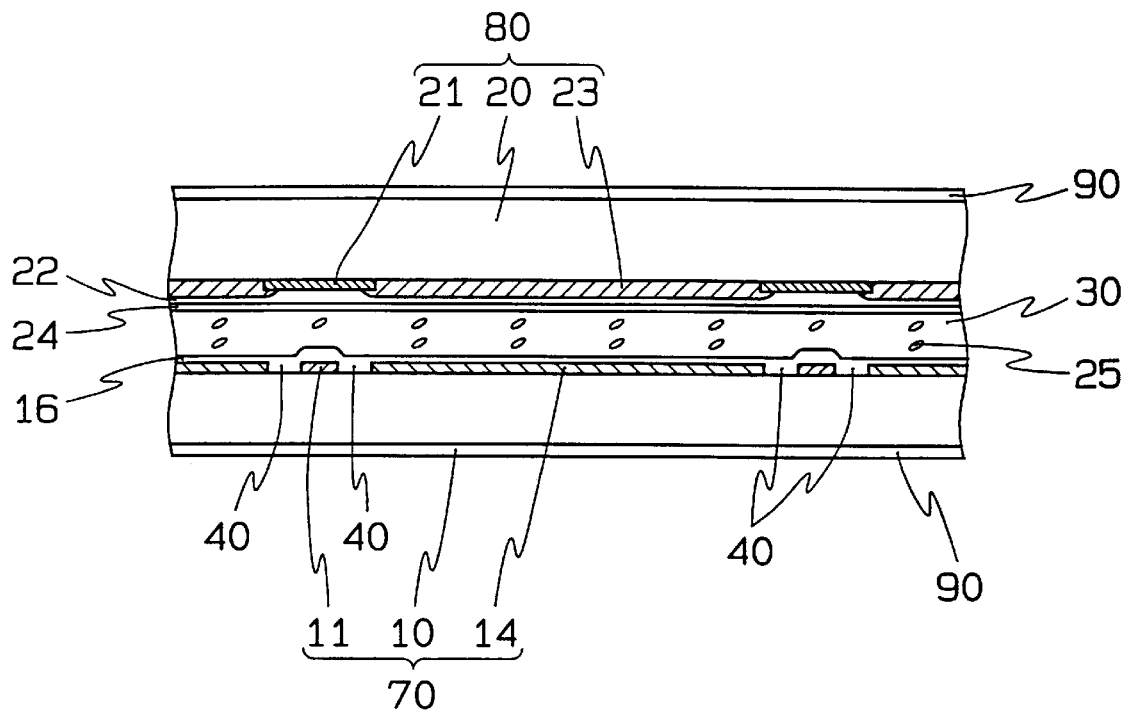
FIG. 5 is a cross-sectional view showing a pixel in the left end portion of LCD according to Embodiment 2 of the present invention.
Figure 6:
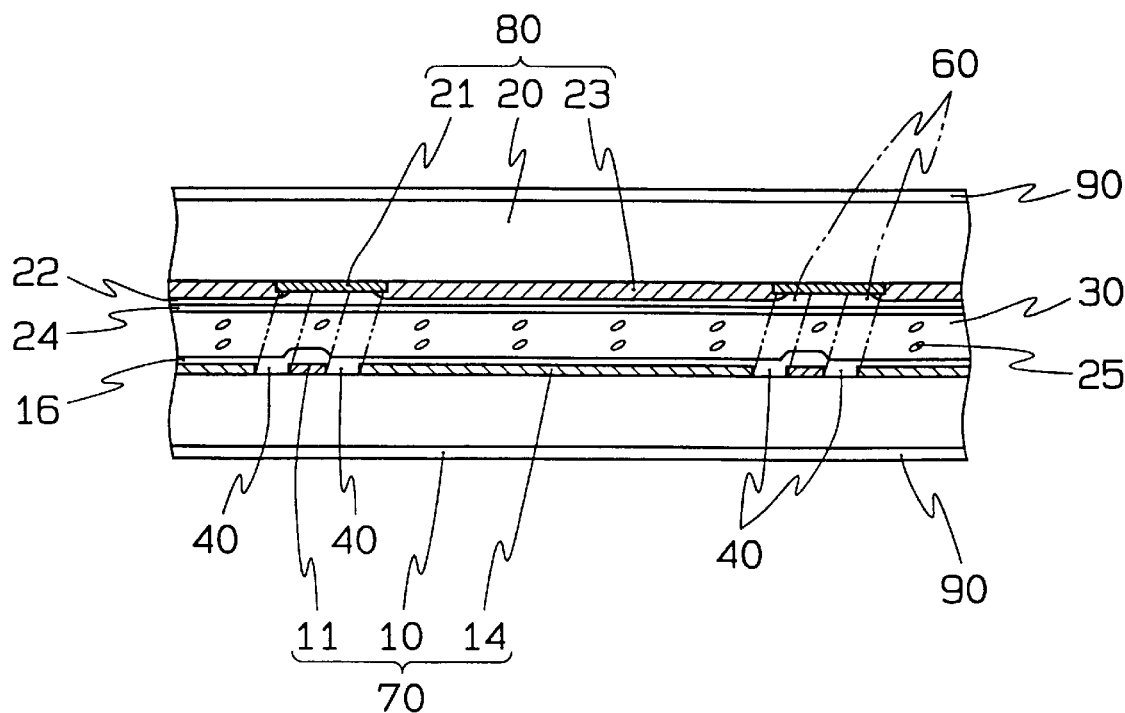
FIG. 6 is a cross-sectional view showing a pixel in the right end portion of LCD according to Embodiment 2 of the present invention.

FIG. 5 is a sectional view of a pixel portion in the central portion of the display area. FIG. 6 is a sectional view of a pixel portion in the end portion of the display area.

According to this embodiment, high aperture is obtained and even in LCD having a large viewing angle, leakage of light 60 from clearance 40 (or clearance 41) between source bus line 11 (or gate bus line 12) of array substrate 10 and pixel electrode 14 in oblique vision is shielded; and further, LCD having an improved displaying quality can be obtained where leakage of light caused by the pattern displacement in forming the pixel pattern of array substrate 70 is restrained.

This embodiment is the same as that of the embodiment except for the following point.

Figure 7:
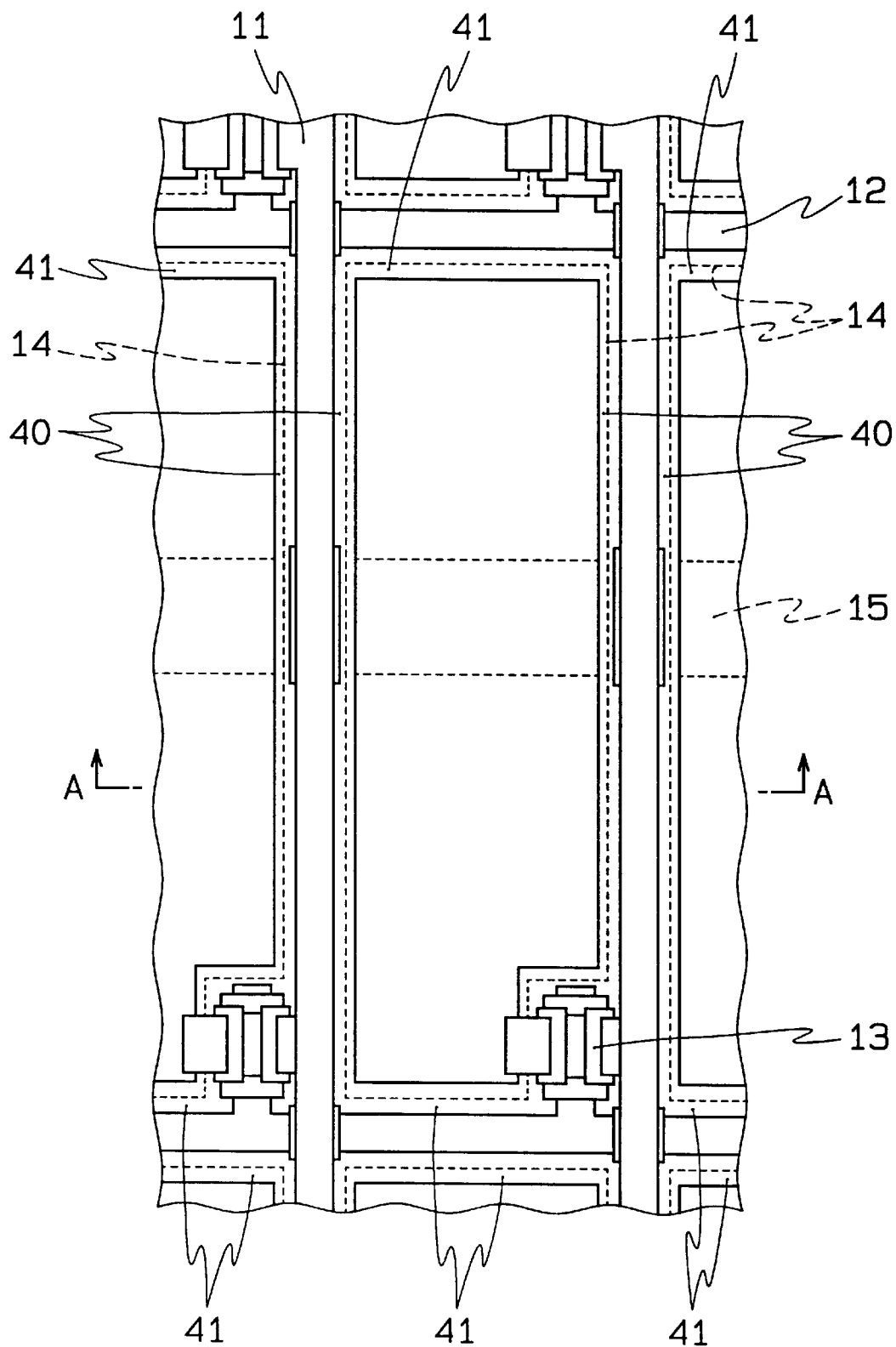
FIG. 7 is a cross-sectional view showing a pixel in the central portion of LCD according to Embodiment 2 of the present invention.
Figure 8:
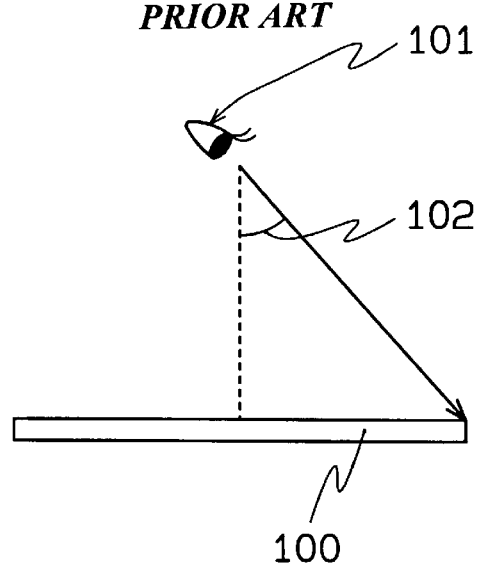
FIG. 8 is an explanatory view illustrating a viewing angle of the conventional LCD.
Figure 9:
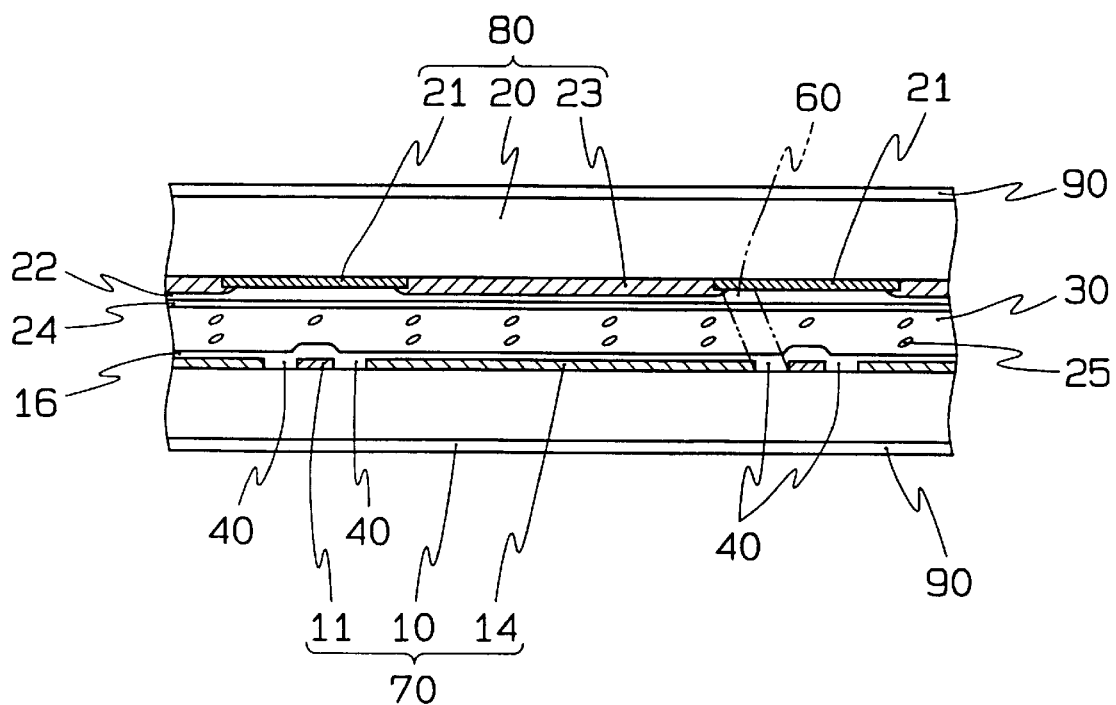
FIG. 9 is a cross-sectional view showing a pixel portion of the conventional LCD.
Figure 10:
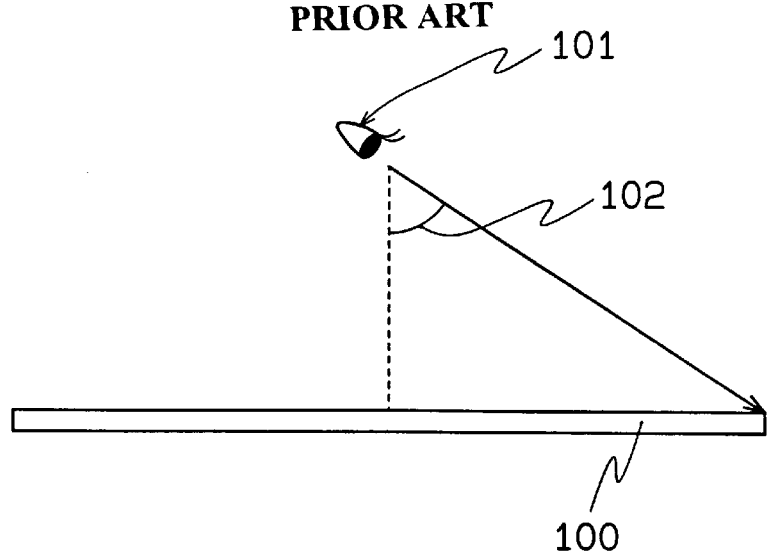
FIG. 10 is an explanatory view illustrating a viewing angle of the conventional LCD having a large display area.
Figure 11:
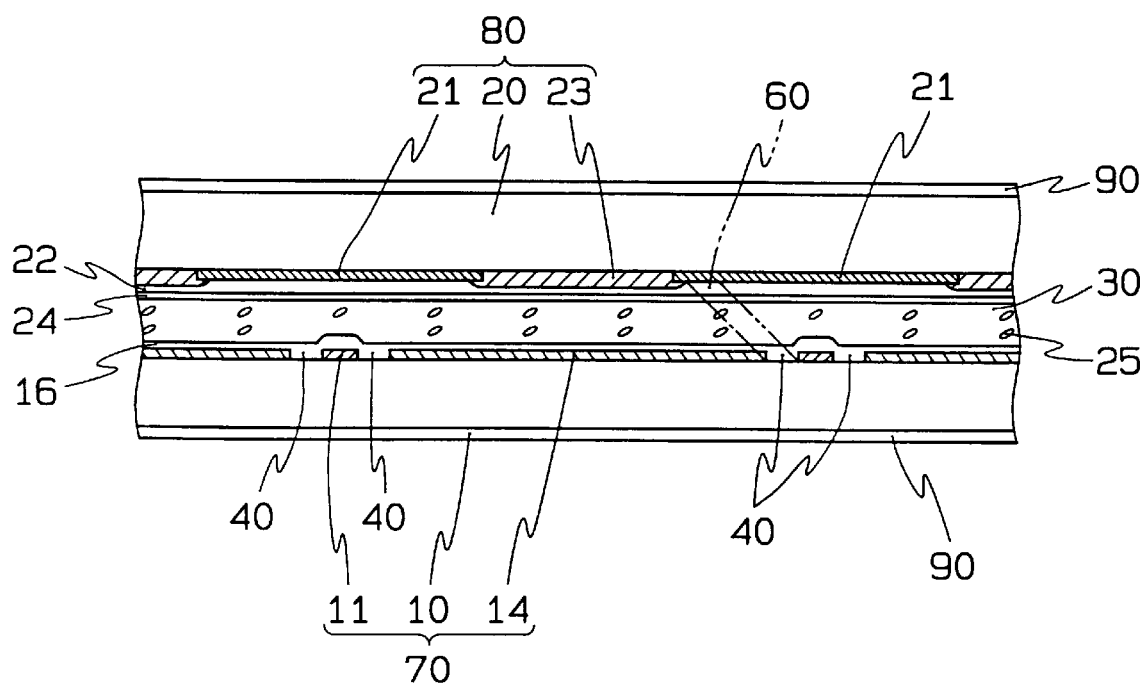
FIG. 11 is a cross-sectional view showing a pixel portion of the conventional LCD having a large display area.
Figure 12:
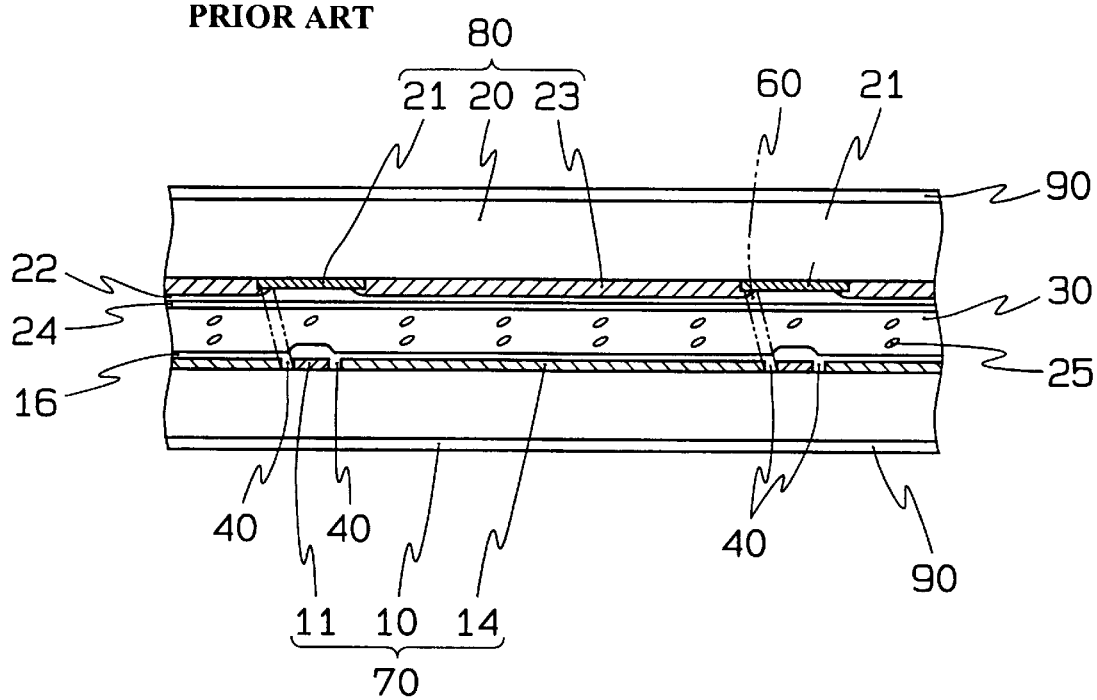
FIG. 12 is a cross-sectional view showing an exposure area in which a pixel pattern on the array substrate is formed as designed.
Figure 13:
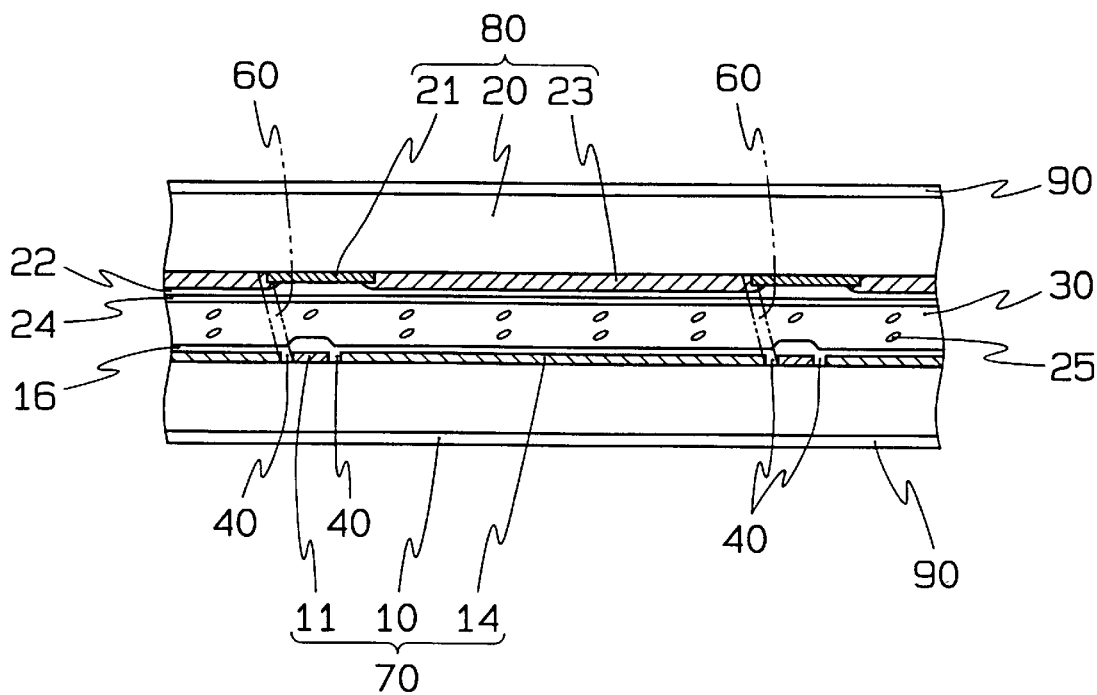
FIG. 13 is a cross-sectional view an exposure area in which a pixel portion on the array substrate is formed in position displaced to the left.

Array substrate 70 of LCD in the embodiment 2 shown in FIG. 4 forms a pixel pattern through the three-time exposing of an exposure area 50a, an exposure area 50b and an exposure area 50c. The pixel pattern of array substrate 70 is formed as follows:

The lower array substrate 70 forms a metal film of 250 nm by sputtering on the first glass substrate composed of an insulating transparent material such as glass or the like, and then, gate electrodes (12 and 13 are not shown) of auxiliary capacitance line 15 of 30 $\mu$m in the width of a predetermined shape, gate bus line 12 of 8 $\mu$m in width, and a TFT 13 are formed by patterning and by etching operations (see FIG. 5, FIG. 6 and FIG. 7).

Then, silicon oxide layer of 350 nm is formed by a plasma CVD method, and an a-Si film and silicon nitride layer of 500 nm and 200 nm are formed respectively by a plasma CVD method. The silicon nitride layer is etched with fluorine acid etchant to form the channel passivation layer of a TFT 13. To make an ohmic contact, n$^+$ type a-Si film of 50 nm is filmed by a plasma CVD method. The n$^+$ type a-Si film and the s-Si film and the silicon nitride are etched, so as to make the predetermined shape.

Then, Cr and Al are laminated by 50 nm and 500 nm by sputtering respectively and are patterned by a lens projection system. The Cr and Al are respectively etched with a mixed liquid of nitric acid, phosphoric acid and acetic acid, and cerium ammonium nitrate liquid to form source bus line 11 of 8 $\mu$m in width, a source electrode 13S (not shown), and drain electrode 13D (not shown).

In the embodiment, precision in the patterning step is 1 $\mu$m in this patterning step.

Namely, when a pixel pattern of array substrate 70 is formed by dividing a display area into a plurality of exposure areas (for example, three areas), it is confirmed that approximate 1 $\mu$m of pattern displacement is generated. The pattern displacement means the displacement of the mark for aligning on the array substrate corresponding to the mark for aligning on the color filter substrate.

An n$^+$ type a-Si film exposed between source electrode 13S and drain electrode 13D is etched by using a source electrode 13S and drain electric electrode 13D as a mask. A transparent conductive film, of 200 nm, such as ITO or the like is formed by sputtering, and is etched by using etchant which comprises mainly aqua regia further containing sulfuric acid and patterned to etch aqua regia etchant so as to form a rectangular pixel electrode 14. A silicon nitride of 200 nm is filmed as a passivation film. In this manner, a pixel pattern of array substrate 70 is formed.

In this embodiment, a pixel pattern of color filter substrate 80 is designed as follows with three exposure areas 50a, 50b and 50c of array substrate 70 being made in the same in size.

In a display area corresponding to exposure area 50a of the central portion of array substrate 70, the distance between the corresponding pixels on color filter substrate 80 is smaller by 1.7 $\mu$m with respect to the distance between the pixels of the left end portion and the right end portion of exposure area 50a of array substrate 70 so that the displacement amount of BM 21 on the color filter substrate to be extended into the inner side of the pixel from the pixel electrode 14 in the pixel of the end of the area may become 0.85 $\mu$m.

Further, in the picture face area corresponding to the exposure areas 50b and 50c of array substrate 70, it is assumed that the displacement amount of the exposure of the divided exposure area of array substrate 70 is the above described 1 $\mu$m in the central direction of the display area. In color filter substrate 80, the distance between pixels of the display area end of the color filter substrate is smaller by 6.8 $\mu$m with respect to the distance between the pixels of the pixel of the left end portion of the picture face of array substrate 70.

Namely, as shown in FIG. 4, the pixel pattern of color filter substrate 80 has to be contracted by division in accordance with exposure area of array substrate 70 to provide Displacement amount of BM 21=0.85×x/a ($\mu$m) in exposure area 50a, Displacement amount of BM 21=2.55×x/2a−0.85/2 ($\mu$m) in exposure areas 50b and 50c, when the distance from central point O of the display area to the pixel is x, and the distance from central point O to the end of exposure area 50a is a.

When leakage of light 60 becomes easy to see through the displacement of exposure for array substrate 70 into the central direction of the display area in exposure areas 50b and 50c, the second pixel pattern of color filter substrate 80 is contracted for each area shown in FIG. 4(B), so as to satisfy the relationship, of the extending amount (namely, displacement amount Z onto the central side of the display area of BM 21) into the pixel electrode of BM 21 formed on the color filter substrate, so as to shield leakage of light 60 to be caused by exposure displacement of array substrate 70 with respect to all the pixels including the end portion of the display area.

According to this embodiment described above, in the display area center as shown in FIG. 5, the gravity center of the pixel in the center of the display area of color filter substrate 80 agrees with the gravity center of the pixel in the center of the display area of array substrate 70. For example, even when exposure for array substrate 70 is displaced, the center of source bus line 11 (or gate bus line 12) of array substrate 70 agrees with the center of BM 21 of color filter substrate 80 so that leakage of light 60 from source bus line 11 (or gate bus line 12) of array substrate 70 and pixel electrode 14 can be shielded.

As shown in FIG. 6, in the pixel of the end portion of the display area, color filter substrate 80 is designed to satisfy the relationship of displacement amount Z of BM shown in FIG. 4(4). Thus, when the shift of exposure of array substrate 70 is caused by 1 $\mu$m, leakage of light 60 from clearance 40 (or 41) between source bus line 11 (or gate bus line 12) of array substrate 70 and pixel electrode 14 can be shielded in the viewing angle to the pixel of the end portion.

Further, as compared with LCD using a color filter substrate where the whole display area of the conventional example is contracted by repetition of the same pixel, BM width of 6.8 $\mu$m is reduced in the pixel of the display area central portion and BM width of 3.4 $\mu$m is reduced in the display area end portion, namely, the light shield portion is reduced, thus improving aperture ratio considerably.

Embodiment 3

In stead of the color filter substrate in LCD of Embodiment 1 or 2, there was used, to produce LCD, a color filter substrate in which a mark for aligning formed on the outside of the display area on the color filter substrate 80 for superposing array substrate 70 and color filter substrate 80 in color filter substrate 80 is provided so as to coincide with the gravity center of the mark for aligning on the side of array substrate 70.

According to the embodiment, LCD can be made without changes, in processing, in the color filter substrate manufactured so far.

The liquid crystal display according to the present invention according to the present invention comprises; an array substrate; a color filter substrate opposite to the array substrate; a liquid crystal material interposed between the array substrate and the color filter substrate; a plurality of parallely spaced gate bus lines provided on the array substrate; a plurality of parallely spaced source bus lines extending in the direction perpendicular to the direction of the gate bus lines and intersecting the gate bus lines, the plurality of gate bus lines and the plurality of source bus lines being arranged in lattice shape as a first pixel pattern, an area surrounded by any two adjacent gate bus lines and any two adjacent source bus lines being a first pixel portion; a plurality of pixel electrodes each provided in the first pixel portion; a plurality of colored layers each provided on the color filter substrate; and a light shield portion arranged in lattice shape as a second pixel pattern, the lattice shape having blank areas spaced by approximately equal distances on the color filter substrate, each blank area partitioned by the light shield portion the each blank area serving as a second pixel portion, each colored layer being provided in the second pixel portion so that the plurality of colored layers are partitioned by the light shield portion by approximately equal distance to form the second pixel portion, the second pixel portion corresponding to the first pixel portion; wherein at a central portion of the first pixel pattern, gravity center of first pixel portion provided at the central portion of the first pixel pattern corresponds to gravity center of second pixel portion provided at a central portion of the second pixel pattern; and wherein at an end portion of the first pixel pattern, with respect to each viewing angle to each pixel, each second distance between any two adjacent gravity centers of pixels provided in the second pixel pattern is reduced to be shorter by prescribed length than each corresponding first distance between any two adjacent gravity centers of pixels corresponding to gravity centers of pixels provided in the first pixel pattern, in whole display area, so that the light shield portion on the color filter substrate shields leakage of light from the array substrate.

When in the entire area of the display area, the width of the light shield portion (namely, black matrix) of the color filter substrate is almost the same as the width of the smallest width necessary for the pixel of the display area central portion, it is possible to shield the leakage of light from the array substrate when seen from the visual point of observer, and the large-sized LCD having high displaying quality capable of improving high aperture ratio and constraining the influences of leakage of light.

In the liquid crystal display according to the present invention, wherein each second distance is reduced to be shorter than the each corresponding first distance in order to satisfy the following relationship $$Z \geq \sum_L T_L \times \tan\left[\sin^{-1}\left(\frac{n_A}{n_L}\sin\theta\right)\right]$$

wherein $\theta$ represents a viewing angle to any one of pixels in the second pixel pattern; $T_L$ represents each thickness of layers through which leakage of light transmits, the layers being located from an upper surface of a first glass substrate to a lower surface of a second glass substrate, the first glass substrate serving as a base member of the array substrate, the second glass substrate serving as a base member of the color filter substrate; $n_L$ represents each refractive indexes of the layers; $n_A$ represents a refractive index of air existing from the upper surface of the array substrate to view-point; and Z represents a displacement amount of a gravity center of the any one of pixel in the second pattern with respect to a gravity center of a corresponding pixel in the first pattern toward the central portion of the display area so that the each second distance is reduced to be shorter than the each corresponding first distance.

In the entire area of the display area, the width of the light shield portion of the color filter substrate becomes almost the same as the smallest width necessary for the pixel of the display area center portion. The large-sized LCD having high displaying quality capable of shielding leakage of light from the array substrate when seen from observer, improving high aperture ratio and constraining the influences of leakage of light can be realized.

In the liquid crystal display according to the present invention; the second pixel pattern is divided to a plurality of areas and, with respect to each viewing angle to each divided area, the each second distance is reduced to be shorter than the each corresponding first distance per the each divided area so that the light shield portion shields the leakage of light.

The large-sized LCD can be realized which prevents luminance difference for each exposure area to be caused by displacement of exposure area of the array substrate and can shield leakage of light from the array substrate caused when seen by observer.

In the liquid crystal display according to the present invention, a gravity center of a mark for aligning provided for the sake of superposing the array substrate and the color filter substrate at predetermined position, the mark for aligning being provided at outside of a display area on said color filter substrate, corresponds to gravity center of mark for aligning provided on the array substrate.

The large-sized LCD can be realized which can increase aperture ratio by optimizing the width of the light shield portion of the color filter substrate, without changes of conditions in manufacturing the process for superposing substrate or the cutting process, can prevent leakage of light from the array substrate or can prevent the luminance difference for each of exposure areas of the array substrate.

What is claimed is:

1. A liquid crystal display comprising:
   an array substrate;
   a color filter substrate opposite to said array substrate;
   a liquid crystal material interposed between said array substrate and said color filter substrate;
   a plurality of parallely spaced gate bus lines provided on said array substrate;
   a plurality of parallely spaced source bus lines extending in the direction perpendicular to the direction of said gate bus lines and intersecting said gate bus lines, said plurality of gate bus lines and said plurality of source bus lines being arranged in lattice shape as a first pixel pattern, an area surrounded by any two adjacent gate bus lines and any two adjacent source bus lines being a first pixel portion;
   a plurality of pixel electrodes each provided in said first pixel portion;
   a plurality of colored layers each provided on said color filter substrate; and
   a light shield portion arranged in lattice shape as a second pixel pattern, said lattice shape having blank areas spaced by approximately equal distances on said color filter substrate, each blank area partitioned by said light shield portion said each blank area serving as a second pixel portion, each colored layer being provided in said second pixel portion so that said plurality of colored layers are partitioned by said light shield portion by approximately equal distance to form said second pixel portion, said second pixel portion corresponding to said first pixel portion;

wherein at a central portion of said first pixel pattern, gravity center of first pixel portion provided at said central portion of said first pixel pattern corresponds to gravity center of second pixel portion provided at a central portion of said second pixel pattern; and wherein at an end portion of said first pixel pattern, with respect to each viewing angle to each pixel, each second distance between any two adjacent gravity centers of pixels provided in said second pixel pattern is reduced to be shorter by prescribed length than each corresponding first distance between any two adjacent gravity centers of pixels corresponding to gravity centers of pixels provided in said first pixel pattern, in whole display area, so that said light shield portion on said color filter substrate shields leakage of light from said array substrate.

2. The liquid crystal display of claim 1, wherein each second distance is reduced to be shorter than said each corresponding first distance in order to satisfy the following relationship $$Z \geq \sum_L T_L \times \tan\left[\sin^{-1}\left(\frac{n_A}{n_L}\sin\theta\right)\right]$$

wherein $\theta$ represents a viewing angle to any one of pixels in said second pixel pattern;

$T_L$ represents each thickness of layers through which leakage of light transmits, the layers being located from an upper surface of a first glass substrate to a lower surface of a second glass substrate, said first glass substrate serving as a base member of said array substrate, said second glass substrate serving as a base member of said color filter substrate;

$n_L$ represents each refractive indexes of said layers;

$n_A$ represents a refractive index of air existing from said upper surface of said array substrate to view-point; and Z represents a displacement amount of a gravity center of said any one of pixel in said second pattern with respect to a gravity center of a corresponding pixel in said first pattern toward said central portion of said display area.

so that said each second distance is reduced to be shorter than said each corresponding first distance.

3. The liquid crystal display of claim 1, wherein said second pixel pattern is divided to a plurality of areas and, with respect to each viewing angle to each divided area, said each second distance is reduced to be shorter than said each corresponding first distance per said each divided area so that said light shield portion shields said leakage of light.

4. The liquid crystal display of claim 1, wherein a gravity center of a mark for aligning provided for the sake of superposing said array substrate and said color filter substrate at predetermined position, said mark for aligning being provided at outside of a display area on said color filter substrate, corresponds to gravity center of mark for aligning provided on said array substrate.

* * * * *